United States Patent [19]

Okubo

[11] Patent Number: 6,064,642

[45] Date of Patent: May 16, 2000

[54] PHASE-CHANGE TYPE OPTICAL DISK

[75] Inventor: Shuichi Okubo, Tokyo, Japan

[73] Assignee: NEC Corporation, Tokyo, Japan

[21] Appl. No.: 09/233,178

[22] Filed: Jan. 19, 1999

[30] Foreign Application Priority Data

Jan. 16, 1998 [JP] Japan .................................. 10-006217

[51] Int. Cl.⁷ .................................................. G11B 7/24
[52] U.S. Cl. ................ 369/275.1; 428/64.4; 430/270.13
[58] Field of Search .............................. 369/275.1, 275.2,
369/275.5, 272, 288; 428/64.2, 64.4; 430/270.13,
290

[56] References Cited

U.S. PATENT DOCUMENTS

| 5,410,534 | 4/1995 | Nagata et al. | 369/275.4 |
| 5,424,106 | 6/1995 | Yamada et al. | 428/64.6 |
| 5,719,006 | 2/1998 | Ohkubo | 369/275.2 |

FOREIGN PATENT DOCUMENTS

| 5-89521 | 4/1993 | Japan . |
| 6-44606 | 2/1994 | Japan . |
| 6-155921 | 6/1994 | Japan . |
| 7-73522 | 3/1995 | Japan . |
| 7-104424 | 4/1995 | Japan . |
| 7-93804 | 4/1995 | Japan . |
| 7-262607 | 10/1995 | Japan . |
| 9-237435 | 9/1997 | Japan . |
| 9-245378 | 9/1997 | Japan . |
| 9-251674 | 9/1997 | Japan . |
| 9-265657 | 10/1997 | Japan . |

*Primary Examiner*—Tan Dinh
*Attorney, Agent, or Firm*—Young & Thompson

[57] ABSTRACT

A first dielectric layer, a second dielectric layer, a third dielectric layer, a recording layer, a fourth dielectric layer, and a reflective layer are provided in that order on a substrate to constitute a phase-change type optical disk. The first dielectric layer, the second dielectric layer, and the third dielectric layer are constructed to satisfy the relationships: n1>n2 and n3>n2 wherein n1 represents the refractive index of the first dielectric layer, n2 represents the refractive index of the third dielectric layer, n3 represents the refractive index of the second dielectric layer. According to the above construction, the light reflectance of the amorphous area can be increased to lower the light absorption of the amorphous area, realizing inhibition of cross erasing. Further, since no light absorptive layer is present between the substrate and the recording layer, the temperature rise around the surface of the substrate can be inhibited to reduce the thermal deformation of the substrate. This can improve rewrite cycling properties.

5 Claims, 5 Drawing Sheets n1: REFRACTIVE INDEX OF FIRST DIELECTRIC LAYER
n2: REFRACTIVE INDEX OF SECOND DIELECTRIC LAYER
n3: REFRACTIVE INDEX OF THIRD DIELECTRIC LAYER n3>n2  n1>n2

Al(100)/ZnS-SiO2(d)/GeSbTe(13)/ZnS-SiO2(60)/Layer2(100)/Layer1(100)/PC

M1, M3: AMOURPHOUS RECORD MARKS

T1, T2, T3: TRACKS

SP: LASER BEAM SPOT

PHASE-CHANGE TYPE OPTICAL DISK

FIELD OF THE INVENTION

The invention relates to an optical information recording medium that permits information to be recorded thereon and reproduced therefrom by laser beam irradiation, and more particularly to a phase-change type optical disk wherein information is recorded thereon by creating a phase change in a recording layer and is reproduced therefrom by utilizing a difference in optical properties between the amorphous state and the crystal state of the recording layer.

In recent years, magneto-optical disks and phase-change type optical disks have been proposed as optical information recording media utilizing optical technology. Among them, phase-change type optical disks record information by changing the recording layer from the crystal state to the amorphous state or vice versa and reproduce information by utilizing a difference in light reflectance or light transmittance between the crystal state and the amorphous state of the recording layer. In the conventional phase-change type optical disks, the light absorption in the amorphous state, Aa, is generally higher than the light absorption in the crystal state, Ac. For this reason, when the pitch of recording tracks of the phase-change type optical disk is decreased in order to increase the track density, recording of information by applying a laser beam to a certain recording track to cause a phase change in the recording layer causes light to be absorbed by an amorphous record mark having high light absorption present in adjacent record tracks, resulting in temperature rise/crystallization, that is, the so-called cross erasing.

Rendering the light absorption in the amorphous state, Aa, lower than the light absorption in the crystal state, Ac, is considered effective for preventing the cross erasing. Methods for rendering Aa lower than Ac are disclosed, for example, in Japanese Patent Laid-Open Nos. 149238/1989 and 93804/1995 and Proceedings of The 5th Symposium for Society for the Research of Phase-change Type Recording (Dai 5 Kai So-henka Kiroku Kenkyukai Shinpojumu Yokoshu), p. 92–94. In these methods, however, it is difficult to render Aa much lower than Ac while maintaining the large difference between Ra and Rc, particularly for a short-wavelength light source.

Further, the conventional phase-change type optical disks have an additional problem that, due to the nature of the construction, heat load is increased and, consequently, the possible number of times of rewriting of information is small and, particularly, in the case of low linear velocity, is significantly limited. For example, in the construction shown in FIG. 1 on page 94 of Proceedings of The 5th Symposium for Society for the Research of Phase-change Type Recording, a light absorptive reflective layer (a very thin gold layer) is provided just on the substrate. In this construction, at the time of information recording, the reflective layer absorbs the laser beam and consequently is heated, and this causes heat load to be applied to the substrate located just under the reflective layer, resulting in limited possible number of times of rewriting of information. In particular, at a low linear velocity of not more than 8 m/sec, the possible number of times of rewriting is significantly limited.

SUMMARY OF THE INVENTION

Accordingly, an object of the invention is to provide a phase-change type optical disk that can inhibit cross erasing and, at the same time, has excellent rewrite cycling properties.

According to the first feature of the invention, a phase-change type optical disk comprises: a substrate; and, provided on the substrate in the following order, a first dielectric layer, a second dielectric layer, a third dielectric layer, a recording layer, a fourth dielectric layer, and a reflective layer, the refractive index $n_2$ of the second dielectric layer and the refractive index $n_3$ of the third dielectric layer satisfying the relationship $n_2<n_3$, the light absorption of the recording layer in amorphous state being lower than that of the recording layer in crystal state. Preferably, the refractive index $n_1$ of the first dielectric layer and the refractive index $n_2$ of the second dielectric layer satisfy the relationship $n_1>n_2$.

In the phase-change type optical disk of the invention, when the wavelength of a light source used in information recording/reproduction is $\lambda$, the refractive index of the first dielectric layer at the wavelength $\lambda$ is preferably more than 1.7. Preferably, the reflective layer is formed of a metal selected from the group consisting of gold, aluminum, titanium, copper, chromium, and alloys of the metals. The thickness of the reflective layer is preferably 40 to 300 nm.

According to the invention, when the refractive indexes $n_2$, $n_3$ of the second dielectric layer and the third dielectric layer provided between the substrate and the recording layer are set so as to satisfy the relationship $n_3>n_2$, Ra can be rendered higher than Rc in the recording layer to render Aa lower than Ac. Further, when the refractive indexes $n_1$, $n_2$ of the first and second dielectric layers among the first, second, and third dielectric layers provided between the substrate and the recording layer are set so as to satisfy the relationship $n_1>n_2$, the degree of freedom can be increased for the thickness of each of the layers. Further, according to the invention, since no light absorptive layer is present between the recording layer and the substrate, the temperature rise around the surface of the substrate can be inhibited to reduce the heat load applied to the substrate. This can increase the possible number of times of rewriting of information.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
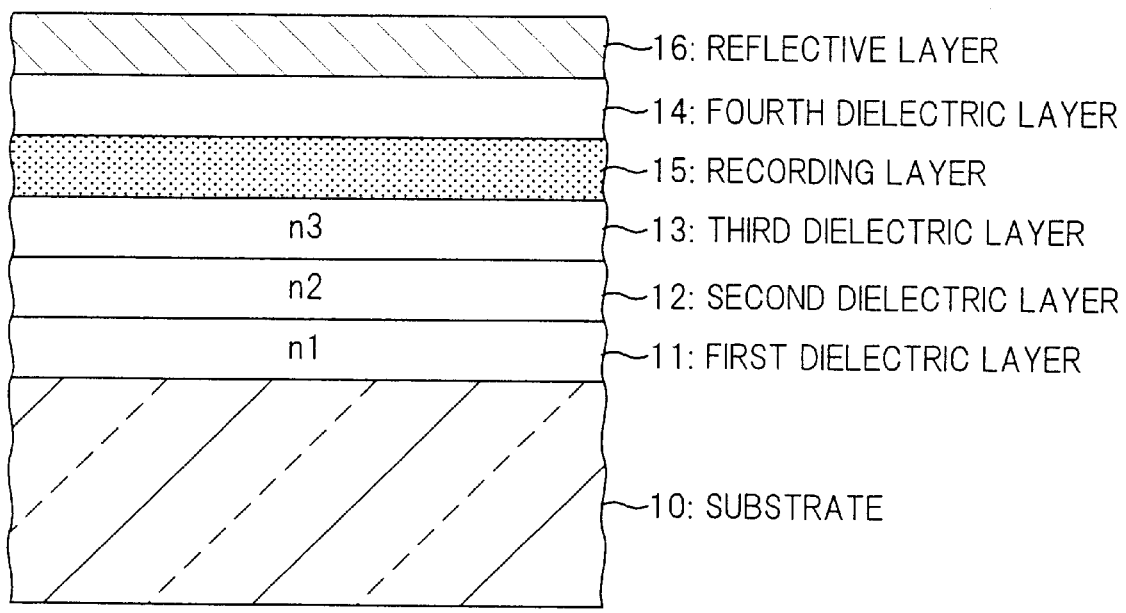
FIG. 1 is a diagram showing the construction of a phase-change type optical disk according to a preferred embodiment of the invention.

Preferred embodiments of the invention will be described in conjunction with the appended drawings. FIG. 1 is a cross-sectional view of a phase-change type optical disk according to a preferred embodiment of the invention. The phase-change type optical disk has a structure comprising: a transparent substrate 10; and, provided on the transparent substrate 10 in the following order, a first dielectric layer 11, a second dielectric layer 12, a third dielectric layer 13, a recording layer 15, a fourth dielectric layer 14, and a reflective layer 16.

Figure 2:
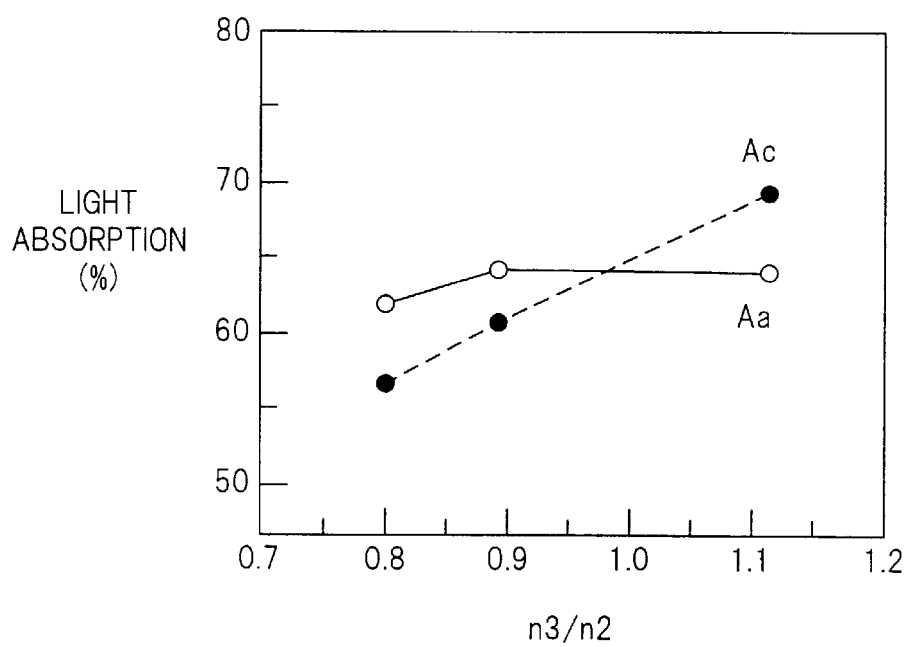
FIG. 2 is a diagram showing one example of optical properties of an optical disk according to a preferred embodiment of the invention.
Figure 3:
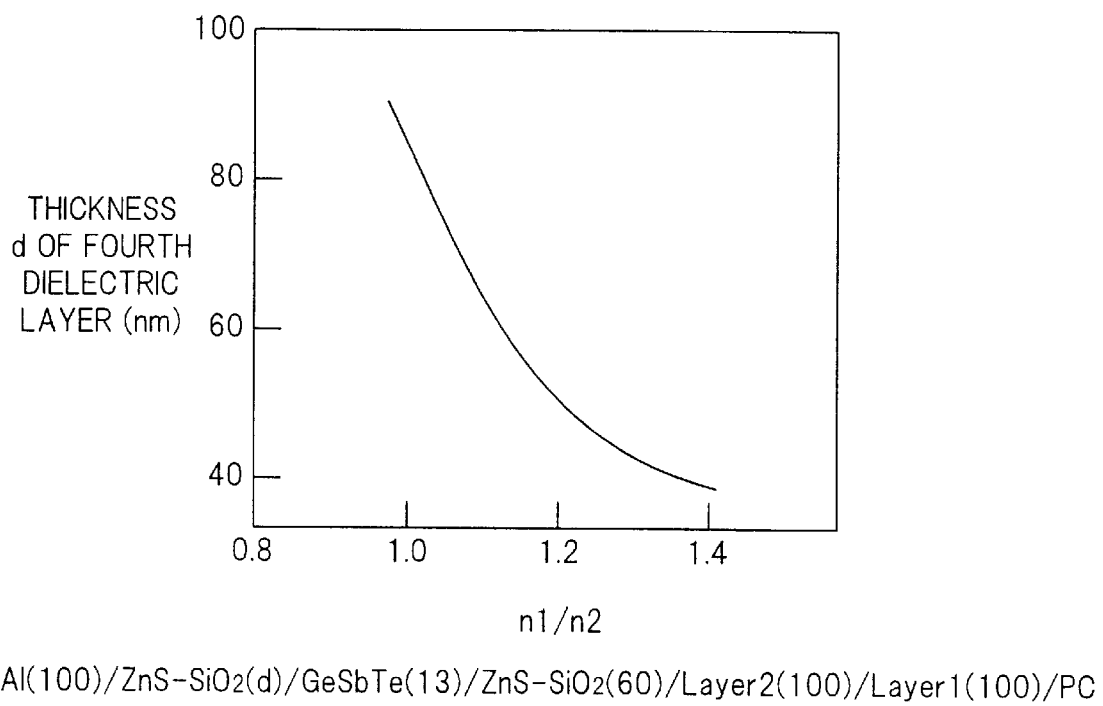
FIG. 3 is a diagram showing the relationship between the ratio of the refractive index of the first dielectric layer to the refractive index of the second dielectric layer and the thickness of the fourth dielectric layer for a phase-change type optical disk according to a preferred embodiment of the invention wherein Ac is larger than Aa.

FIG. 2 is a diagram showing the relationship between the change in n3/n2 ratio and the Aa and Ac values, determined by optical calculation according to the matrix method. As is apparent from FIG. 2, when the relationship n2<n3 is satisfied, Aa is lower than Ac. Preferably, the refractive index ni of the first dielectric layer and the refractive index n2 of the second dielectric layer satisfy the relationship n1>n2. Even though the relationship n1>n2 is not satisfied, it is not impossible to realize Aa <Ac. In this case, however, when n1=n2 or n1<n2, the thickness of the fourth dielectric layer, which can realize Aa<Ac, is limited, making it difficult to ensure satisfactory rewrite cycling properties. FIG. 3 is a diagram showing the lower limit of the thickness of the fourth dielectric layer, which can realize Aa<Ac, determined by optical calculation according to the matrix method. From FIG. 3, it is apparent that, when n1≦n2, the thickness of the fourth dielectric layer should be not less than 90 nm. In order to improve the rewrite cycling properties, the thickness of the fourth dielectric layer is preferably as small as possible and not more than 60 nm. For this reason, it is preferred to satisfy the relationship n1>n2.

Figure 4:
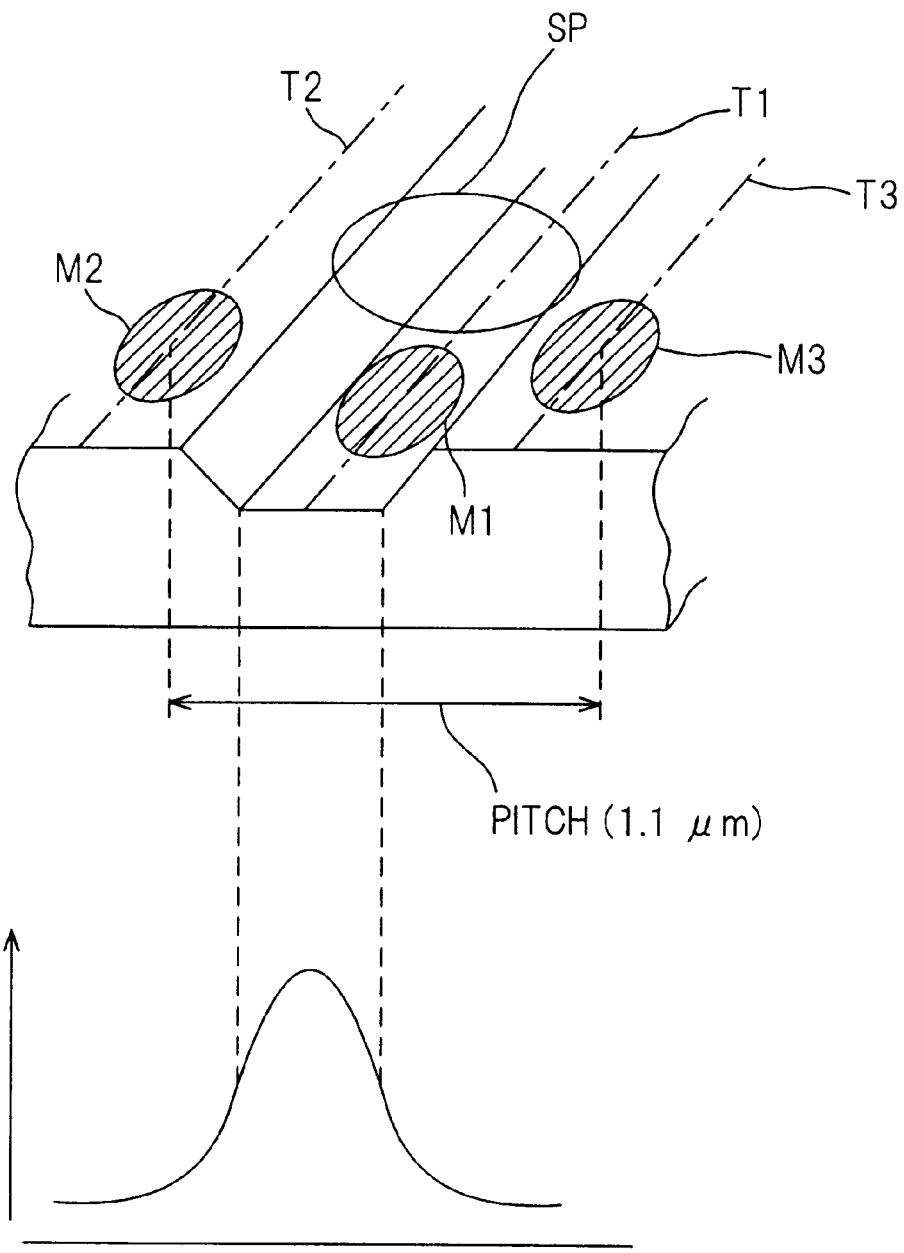
FIG. 4 is a diagram illustrating temperature rise upon information recording.

Thus, in the recording layer, when the light absorption in the amorphous state, Aa, has been rendered lower than the light absorption in the crystal state, Ac, as shown in FIG. 4, application of a laser beam spot SP to one record track (groove) T1 in a phase-change optical disk to form a record mark M1 and consequently to record information creates temperature distribution as shown in FIG. 4 around the record track T1 in the recording layer 15 by heat energy of the laser beam. For this reason, when record marks M2, M3 in amorphous state with information recorded thereon are present in adjacent record tracks (lands) T2, T3, the record marks M2, M3 are influenced by the temperature of the laser beam spot SP. Since, however, the light absorption of the record marks M2, M3 in amorphous state, Aa, is lower than the light absorption of the recording track T1 in crystal state, Ac, the amount of laser beam absorbed in the record marks M2, M3 is reduced, inhibiting the temperature rise of the record marks M2, M3. This can prevent the record marks M2, M3 from being erased, that is, can prevent cross erasing.

In this case, when the refractive index n1 of the first dielectric layer 11 is identical to the refractive index n0 of the substrate 10, the substrate 10 is optically identical to the first dielectric layer 11, making it impossible to attain the effect of rendering Ra higher than Rc, that is, optical interference effect. Therefore, the refractive index n1 of the first dielectric layer 11 should be larger than the refractive index n0 of the substrate 10. Since plastic substrates and glass substrates generally have a refractive index of about 1.5, n1 should be larger than 1.7.

Further, in this construction, no light absorptive layer is provided between the substrate 10 and the recording layer 15. This can inhibit the temperature rise around the surface of the substrate 10, can reduce the application of heat load to the substrate, and can improve rewrite cycling properties. The reflective layer 16 is formed of a metallic material in order to enhance radiation properties and to improve rewrite cycling properties. The thickness of the reflective layer 16 is preferably 40 to 300 nm. When the thickness of the reflective layer 16 is less than 40 nm, satisfactory radiation properties cannot be provided, resulting in deteriorated rewrite cycling properties, while when the thickness exceeds 300 nm, the reflective layer 16 is likely to be separated.

Preferred embodiments of the invention will be described. A phase-change type optical disk as shown in FIG. 1 was prepared as follows. Polycarbonate was provided as the substrate 10. A 60 nm-thick ZnS—$SiO_2$ layer was sputtered on the substrate 10 to form the first dielectric layer 11. A 90 nm-thick $SiO_2$ layer was then sputtered on the first dielectric layer 11 to form the second dielectric layer 12. A 50 nm-thick ZnS—$SiO_2$ layer was then sputtered on the second dielectric layer 12 to form the third dielectric layer 13. A 12 nm-thick $Ge_2Sb_2Te_5$ layer was sputtered on the third dielectric layer 13 to form the recording layer 15. A 40 nm-thick ZnS—$SiO_2$ layer was then sputtered on the recording layer 15 to form the fourth dielectric layer 14. Finally, a 120 nm-thick aluminum layer was sputtered on the fourth dielectric layer 14 to form the reflective layer 16. Thus, a phase-change type optical disk as shown in FIG. 1 was obtained. In this case, the refractive index n of the third dielectric layer 13 (ZnS—$SiO_2$) was 2.1, and the refractive index n of the second dielectric layer 12 ($SiO_2$) 1.5. The pitch of guide grooves for record tracks (track pitch) as shown in FIG. 4 was 1.1 μm.

Figure 5:
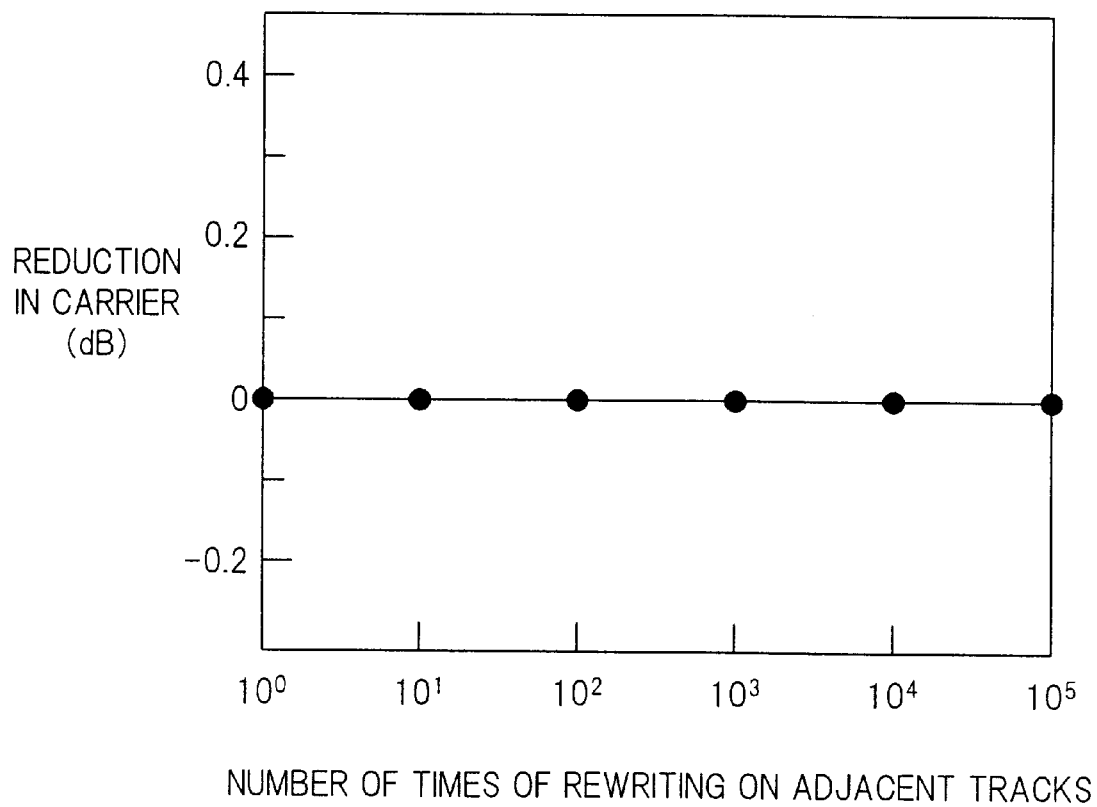
FIG. 5 is a diagram showing cross erasing properties.

For this phase-change type optical disk, the light absorption of the recording layer 15 in crystal state, Ac, and the light absorption of the recording layer 15 in amorphous state, Aa, were measured and found to be 90% (Ac) and 60% (Aa), respectively. Further, for the phase-change type optical disk, a rewrite test was carried out under conditions of rotation at a linear velocity of 5 m/sec, a wavelength of 660 nm, and a numerical aperture of an object lens of 0.6 in an optical head. A signal of 1 MHz and duty=50% was first recorded on a land potion. Thereafter, a signal of 1.5 MHz and duty=50% was repeatedly recorded on both groove portions adjacent to the land portion to measure a change in carrier of the 1 MHz signal. As is apparent from FIG. 5, repetition of rewriting of information on the adjacent groove portions did not have an influence on the 1 MHz signal at all. In FIG. 5, the difference between a carrier Ci of 1 MHz signal, as measured in such a state that no information is recorded on the adjacent tracks, and a carrier C1 of 1 MHz signal, as measured after repetition of recording of 1.5 MHz signal on the adjacent tracks a predetermined number of times, that is, Ci–C1, is indicated. A signal of 1 MHz and duty=50% was repeatedly recorded on the phase-change type optical disk. As a result, there was no change in carrier and noise of 1 MHz signal until the recording was repeated 500,000 times.

A second preferred embodiment will be explained. Polycarbonate was provided as the substrate 10. A 100 nm-thick ZnS layer was sputtered on the substrate 10 to form the first dielectric layer 11. A 50 nm-thick SiN layer was then sputtered on the first dielectric layer 11 to form the second dielectric layer 12. An 80 nm-thick ZnS layer was then sputtered on the second dielectric layer 12 to form the third dielectric layer 13. A 15 nm-thick $GeSb_2Te_4$ layer was sputtered on the third dielectric layer 13 to form the recording layer 15. A 20 nm-thick ZnS—$SiO_2$ layer was then sputtered on the recording layer 15 to form the fourth dielectric layer 14. Finally, a 100 nm-thick aluminum layer was sputtered on the fourth dielectric layer 14 to form the reflective layer 16. Thus, a phase-change type optical disk was obtained. In this case, the refractive index of the second dielectric layer 12 (SiN) was 1.9, and the refractive index of the first dielectric layer 11 and the third dielectric layer 13 (ZnS) was 2.3. The pitch of guide grooves for record tracks (track pitch) as shown in FIG. 4 was 1.1 μm.

For this phase-change type optical disk, Ac and Aa in the recording layer 15 were 85% and 65%, respectively. For the phase-change type optical disk, a rewrite test was carried out under conditions of rotation at a linear velocity of 5 m/sec, a wavelength of 660 nm, and a numerical aperture of an object lens of 0.6 in an optical head. In the same manner as in the above preferred example, a signal of 1 MHz and duty=50% was first recorded on a land potion, followed by repeated recording of a signal of 1.5 MHz and duty=50% on both groove portions adjacent to the land portion to measure a change in carrier of the 1 MHz signal. Also for this phase-change type optical disk, repetition of rewriting of information on the adjacent groove portions did not have an influence on the 1 MHz signal at all. A signal of 1 MHz and duty=50% was repeatedly recorded on the phase-change type optical disk. As a result, there was no change in carrier and noise of 1 MHz signal until the recording was repeated 500,000 times.

An additional preferred embodiment will be explained. Polycarbonate was provided as the substrate 10. A 100 nm-thick SiN layer was sputtered on the substrate 10 to form the first dielectric layer 11. A 20 nm-thick $SiO_2$ layer was then sputtered on the first dielectric layer 11 to form the second dielectric layer 12. A 100 nm-thick ZnS layer was then sputtered on the second dielectric layer 12 to form the third dielectric layer 13. A 13 nm-thick $GeSb_2Te_4$ layer was sputtered on the third dielectric layer 13 to form the recording layer 15. A 50 nm-thick $ZnS$—$SiO_2$ layer was then sputtered on the recording layer 15 to form the fourth dielectric layer 14. Finally, a 100 nm-thick aluminum layer was sputtered on the fourth dielectric layer 14 to form the reflective layer 16. Thus, a phase-change type optical disk was obtained. In this case, the refractive index of ZnS was 2.3, the refractive index of SiN 1.9, and the refractive index of $SiO_2$ 1.5. The track pitch was the same as that in each of the above preferred embodiments, that is, 1.1 µm.

For this phase-change type optical disk, Ac and Aa in the recording layer 15 were 80% and 60%, respectively. For the phase-change type optical disk, a rewrite test was carried out under conditions of rotation at a linear velocity of 5 m/sec, a wavelength of 860 nm, and a numerical aperture of an object lens of 0.6 in an optical head. In the same manner as in the above preferred example, a signal of 1 MHz and duty=50% was first recorded on a land potion, followed by repeated recording of a signal of 1.5 MHz and duty=50% on both groove portions adjacent to the land portion to measure a change in carrier of the 1 MHz signal. Also for this phase-change type optical disk, repetition of rewriting of information on the adjacent groove portions did not have an influence on the 1 MHz signal at all. A signal of 1 MHz and duty=50% was repeatedly recorded on the phase-change type optical disk. As a result, there was no change in carrier and noise of 1 MHz signal until the recording was repeated 500,000 times.

Materials for the dielectric layer, the recording layer, and the reflective layer constituting the phase-change type optical disk according to the present invention are not limited to those described in the preferred embodiments. In particular, the reflective layer may be formed of, besides the metals described in the preferred embodiments, a metal selected from gold, aluminum, titanium, copper, chromium, and alloys of the above metals.

As described above, the phase-change type optical disk can inhibit cross erasing on adjacent record tracks at the time of recording and can narrow the track pitch of record tracks to improve the record density. Further, the absence of a light absorptive layer between the recording layer and the substrate can inhibit the temperature rise around the surface of the substrate, can reduce the application of heat load to the substrate, and can improve rewrite cycling properties. Furthermore, since the light absorption of the recording layer in amorphous state is reduced, erasing of data can be prevented even in the case of high power caused by a fluctuation in a reproduction laser beam and, in addition, when the wavelength of the laser beam source is shortened in the future, erasing of data by the reproduction laser beam can be prevented.

The invention has been described in detail with particular reference to preferred embodiments, but it will be understood that variations and modifications can be effected within the scope of the invention as set forth in the appended claims.

What is claimed is:

1. A phase-change type optical disk comprising: a substrate; and, provided on the substrate in the following order, a first dielectric layer, a second dielectric layer, a third dielectric layer, a recording layer, a fourth dielectric layer, and a reflective layer, the refractive index n2 of the second dielectric layer and the refractive index n3 of the third dielectric layer satisfying the relationship n2<n3, the light absorption of the recording layer in amorphous state being lower than that of the recording layer in crystal state.

2. The phase-change type optical disk according to claim 1, wherein the refractive index n1 of the first dielectric layer and the refractive index n2 of the second dielectric layer satisfy the relationship n1>n2.

3. The phase-change type optical disk according to claim 1, wherein, when the wavelength of a light source used in information recording/reproduction is λ, the refractive index n1 of the first dielectric layer at the wavelength λ is more than 1.7.

4. The phase-change type optical disk according to claim 1, wherein the reflective layer is formed of a metal selected from the group consisting of gold, aluminum, titanium, copper, chromium, and alloys of the metals.

5. The phase-change type optical disk according to claim 1, wherein the reflective layer has a thickness of 40 to 300 nm.

* * * * *